US011990125B2

(12) United States Patent
Marzorati et al.

(10) Patent No.: US 11,990,125 B2
(45) Date of Patent: May 21, 2024

(54) INTENT DRIVEN VOICE INTERFACE (71) Applicant: KYNDRYL, INC., New York, NY (US)

(72) Inventors: Mauro Marzorati, Lutz, FL (US); Jennifer M. Hatfield, San Francisco, CA (US); Jeremy R. Fox, Georgetown, TX (US); Jennifer L. Szkatulski, Rochester, MI (US)

(73) Assignee: KYNDRYL, INC., New York, NY (US)

( * ) Notice: Subject to any disclaimer, the term of this patent is extended or adjusted under 35 U.S.C. 154(b) by 193 days.

(21) Appl. No.: 17/352,433

(22) Filed: Jun. 21, 2021

(65) Prior Publication Data

US 2022/0406304 A1 Dec. 22, 2022

(51) Int. Cl.
*G10L 15/22* (2006.01)
*G10L 15/30* (2013.01)

(52) U.S. Cl.
CPC ............ *G10L 15/22* (2013.01); *G10L 15/30* (2013.01); *G10L 2015/223* (2013.01)

(58) Field of Classification Search
USPC ...................................................... 704/1–504
See application file for complete search history.

(56) References Cited

U.S. PATENT DOCUMENTS

| 5,702,059 | A | * | 12/1997 | Chu | G06K 7/10881 |
| | | | | | 235/472.01 |
| 5,811,774 | A | * | 9/1998 | Ju | G01J 3/51 |
| | | | | | 235/455 |
| 5,811,784 | A | * | 9/1998 | Tausch | G06K 7/10881 |
| | | | | | 235/472.01 |
| 5,815,200 | A | * | 9/1998 | Ju | G01J 3/51 |
| | | | | | 348/229.1 |
| 8,525,673 | B2 | * | 9/2013 | Tran | A61B 5/0008 |
| | | | | | 340/3.1 |
| 8,538,757 | B2 | * | 9/2013 | Patch | G10L 15/193 |
| | | | | | 704/251 |
| 9,734,169 | B2 | * | 8/2017 | Redlich | G06F 16/21 |
| 10,178,516 | B1 | * | 1/2019 | Falvai | H04L 12/1895 |
| 11,100,933 | B2 | * | 8/2021 | Lefkofsky | G16H 70/20 |
| 11,475,899 | B2 | * | 10/2022 | Lesso | G10L 17/10 |

(Continued)

FOREIGN PATENT DOCUMENTS

WO 2020185497 A1 9/2020

OTHER PUBLICATIONS

Mohammad, R., "Sentiment Analysis using Amazon Comprehend—One of the tools for Natural Language Processing", Noteworthy—The Journal Blog, Jul. 7, 2020, 10 pages, found at: https://blog.usejournal.com/sentiment-analysis-using-amazon-comprehend-one-of-the-tools-for-natural-language-processing-7d16c41d51ca.

(Continued)

*Primary Examiner* — Marcus T Riley
(74) *Attorney, Agent, or Firm* — Dan Housley; Andrew D. Wright; Calderon Safran & Cole P.C.

(57) ABSTRACT

An audio stream received from an audio transceiver. The audio stream is in an environment that includes audio of a first user. An acoustic communication of the first user is detected from the audio stream. An audio intent trigger of the first user is identified from the audio stream and based on the acoustic communication. An assistance action for the first user is initiated in response to the audio intent trigger and by a voice-based interface.

18 Claims, 6 Drawing Sheets

(56) References Cited

U.S. PATENT DOCUMENTS

| | | | | |
|---|---|---|---|---|
| 2007/0123171 | A1* | 5/2007 | Slamka | H04M 1/6066 |
| | | | | 455/66.1 |
| 2008/0278560 | A1* | 11/2008 | Niekawa | B41J 2/2103 |
| | | | | 347/102 |
| 2015/0055933 | A1* | 2/2015 | Liao | G06Q 30/0241 |
| | | | | 386/230 |
| 2016/0077794 | A1* | 3/2016 | Kim | G10L 15/20 |
| | | | | 704/275 |
| 2018/0310159 | A1* | 10/2018 | Katz | H04W 4/50 |
| 2018/0336892 | A1* | 11/2018 | Kim | H04R 3/005 |
| 2018/0350344 | A1* | 12/2018 | Zaslow | G10L 13/027 |
| 2018/0357073 | A1* | 12/2018 | Johnson | H04M 1/72403 |
| 2019/0034157 | A1* | 1/2019 | Steinberg | G06F 3/165 |
| 2019/0082304 | A1* | 3/2019 | Bestor | G06F 16/90332 |
| 2019/0095090 | A1* | 3/2019 | Proctor | G06F 3/04812 |
| 2019/0188328 | A1* | 6/2019 | Oyenan | G06F 16/9535 |
| 2019/0318035 | A1* | 10/2019 | Blanco | G06F 16/9535 |
| 2020/0059776 | A1* | 2/2020 | Martin | H04W 4/025 |
| 2020/0273447 | A1* | 8/2020 | Zhou | G10L 15/148 |
| 2020/0278832 | A1* | 9/2020 | Shahbazi Mirzahasanloo | |
| | | | | H04R 1/1041 |
| 2021/0074288 | A1* | 3/2021 | Stefanski | G06F 16/2471 |
| 2021/0304745 | A1* | 9/2021 | King | G10L 15/19 |
| 2021/0366475 | A1* | 11/2021 | Wilkosz | G06Q 50/26 |
| 2022/0036896 | A1* | 2/2022 | Elkhatib | G10L 25/30 |
| 2022/0238120 | A1* | 7/2022 | Jones | G10L 17/02 |
| 2022/0406304 | A1* | 12/2022 | Marzorati | G06N 3/09 |

OTHER PUBLICATIONS

Detecting Sentiment Using the AWS SDK for Python (Boto), 3 pages, (2021) found at: https://docs.aws.amazon.com/comprehend/latest/dg/get-started-api-sentiment.html#get-started-api-sentiment-python.

IBM—Mobile Push Notifications Catalog and Service Pricing, 11 pages, found at: https://www.ibm.com/cloud/push-notifications.

IBM, Build smarter mobile services and apps, Innovative microservices platform, 6 pages, found at: https://www.ibm.com/mobile.

Wikipedia, "Personal Area Network", 3 pages found at: https://en.wikipedia.org/wiki/Personal_area_network.

Mell, P. et al., "The NIST Definition of Cloud Computing", Recommendations of the National Institute of Standards and Technology, NIST Special Publication 800-145, 7 pages, Sep. 2011.

* cited by examiner

INTENT DRIVEN VOICE INTERFACE

BACKGROUND

The present disclosure relates to audio interfaces, and more specifically, to performing operations based on intent.

Voice-based interfaces may be computing platforms configured to operate in response to a user's voice, such as a home voice assistant located in a residential area. The voice-based interfaces may allow for hands-free operation of a user, such as when they are performing other tasks. Voice-based interfaces may rely on specific commands or phrases.

SUMMARY

According to embodiments, disclosed are a method, system, and computer program product.

An audio stream received from an audio transceiver. The audio stream is in an environment that includes audio of a first user. An acoustic communication of the first user is detected from the audio stream. An audio intent trigger of the first user is identified from the audio stream and based on the acoustic communication. An assistance action for the first user is initiated in response to the audio intent trigger and by a voice-based interface.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to audio interfaces; more particular aspects relate to performing operations based on intent. While the present disclosure is not necessarily limited to such applications, various aspects of the disclosure may be appreciated through a discussion of various examples using this context.

With the rise in popularity of portable and mobile computing devices, there has been an uptake in the use of Voice-based computer interfaces. Voice-based computer interfaces ("voice interface") may be computing platforms configure to operate in response to a user's voice. For example, a user may speak to a virtual assistant artificial intelligence ("AI"), a smart speaker, or another relevant voice assistant device ("voice assistant"). In another example, a user may speak to a smartphone to request and receive information, such as driving directions. In yet another example, a user may communicate with a laptop using their speech to perform Internet web searches. The voice interface may be a collection of hardware, software, or some combination (e.g., firmware) configured to handle audio processing and respond to verbal or spoken requests. Voice interfaces may be popular because they can facilitate multitasking by a user. For example, a user may be able to perform a task with their hands, such as changing a tire that has ruptured. Simultaneously, the user may also be able to issue commands audibly to, and receive audible responses from, the voice interface.

Simultaneously, users may encounter situations that are stressful, emotional, and/or frustrating while also being near mobile computing devices that have voice interfaces. Specifically, in response to these situations, users may become overwhelmed at the ability to process the world around them in a controlled/rational manner and also trying to effectuate change in the environment or take action to alleviate the situation. The stress may affect the ability of a user to think, speak, and act to alleviate the situation for themself or others in the environment around them.

For example, a user may be out on a trip and traveling along a roadway. The user may lose control of their car, get into an accident, run into a natural disaster, or experience other stressful situations. The user may have a smartwatch, smartphone, or other portable computing devices with them during the trip along the roadway. The portable computing device may also be configured with a voice interface. Due to the stressful situation, the user may not be able to operate the voice interface along the roadway. In another example, a user may be at the home of a friend or loved one. The user may notice that another user has fallen or otherwise been injured. The user may urgently desire to issue a command to a voice assistant located in the home of the friend or loved one, but due to the emotion, may not be able to. In yet another example, many users may witness a confrontation in a public area, such as a park. Each of the users may wish to perform some sort of assistance, but witnessing the confrontation may be alarming or distressing to the users. The users, while in an alarmed state, may not be able to perform tasks at the normal accuracy or consistency, such as speaking or responding quickly and accurately.

Voice interfaces may have drawbacks in operation and design that may not be useful when individuals are impassioned, frustrated, or in otherwise stressful situations. One drawback is that voice interfaces are configured to operate based on a wake word. A wake word may be a spoken command that is issued to a voice interface. The wake word may be in the form of a predetermined word, statement, phrase, or other relevant spoken command. The wake word may be predefined or rigid. For example, a voice operated smartphone may operate in response to the words "listen device" spoken by a user. The voice interface may be configured to ignore any other speech of the user and only respond to the "listen device" wake word, before performing any tasks. A user that is stressed may not speak clearly enough for the verbal interface to process the attempt to speak "listen device" by the stressed user.

Another drawback is that many different organizations create voice interfaces and voice-based computing devices. Each organization may create a particular type of voice interface that is different from another in how they operate. For example, a first company may have a computing device that is placed in a home and responds to "Alisha" as the wake word. A second company may have a smartphone operating system that responds to "Alright Billian" as the wake word. A third company may have a line of laptop and tablet computers that respond to "Hi Saba" as the wake word. The variety of wake words may lead to confusion for users in times of urgency, such as when quickly trying to get help. Further, users may be in an environment with multiple devices from many companies and may not remember a wake word for each device or may not be able to trigger each device.

Yet another drawback is that the syntax may be elaborate or complicated to perform a variety of operations or otherwise interact with voice interfaces to perform complicated actions. For example, a user may wish to record a video of an amazing event they are witnessing. Further, the user may also prefer to summon an emergency service to the location of the event. Further still, the user may also wish to send a text message to another user. Each of the operations may be initiated by separate voice commands. Additionally, each voice command may only be performed if preceded by a wake word. During times of amazement, injury, high emotion, or other experience of stress, a user may stumble in trying to speak all of the words and commands with accurate pauses. The user may forget the particular grammar or phrasing of commands and wake words or confuse certain commands with devices of a different brand or type.

Yet still another drawback is that voice interfaces may be tied to limited computing power. For instance, users on average speak at a very particular rate and/or cadence, such as 3.5 to 5.8 syllables a second or one hundred fifty to one hundred seventy words per minute. While other users may be able to understand up to 400 words per minute, computing devices may not perform as well. Some computing devices, such as mobile computing devices may have only a limited cache or memory or may have a low-power central processing unit that is only capable of recognizing between forty to one hundred thirty words per minute in an audio recording. When stressed, a user may speak erratically or quickly, such as up to one hundred eighty words per minute. During a stressful situation, the user may be unable to slow down, enunciate properly, or provide an even tone for recognition by a voice interface.

Embodiments disclosed of an Intent Drive Voice Interface (IDVI) may alleviate one or more of the drawbacks discussed to provide voice based computer operation. The IDVI may be configured to respond to an audible intent of a user. Specifically, the IDVI may be configured to detect an acoustic communication of the user and identify in the acoustic communication an audio intent trigger. The IDVI may perform or initiate an assistance action in response to the identified audio intent trigger to help the user.

The IDVI may operate to perform the operation without the use of or despite the presence of a wake word. Stated another way, in response to an audio intent trigger, the IDVI may perform an assistance action despite the user not actually saying or uttering the wake word. To operate, the IDVI may listen for or receive an audio stream from a computing device, such as a smartphone or wearable device of a user. The IDVI may process the audio stream before, simultaneously to, or after the manufacturer's pre-installed voice interface configured to perform audio processing. The IDVI may perform an analysis technique to identify the audio intent trigger, such as performing natural language processing and/or machine learning.

The IDVI may be trained to recognize various communications, such as words, phrases, or other relevant utterances. For example, the IDVI may be configured to recognize an audio intent trigger of the word or phrases, such as "I'm in trouble", "help", or "come on." These audio intent triggers may be different than the predefined wake word of the particular device, such as "Alright Billian" of a smartphone. In some embodiments, a user may set up various audio intent triggers, such as both the phrase "let's go" and also the phrase "please don't" as audio intent triggers for the same assistance action. If a user states either of these phrases, the IDVI may be configured to perform the same assistance action.

The IDVI may be programmed to recognize various non-verbal communication, such as shouts, yells, cries, or sighs. For example, the IDVI may be configured to recognize an audio intent trigger that includes sound patterns that match anxious or nervous breathing, sound patterns that match crying, sound patterns that match pained noises, and the like. In some embodiments, the IDVI may perform a multi-factor determination of an audio intent trigger. For example, an IDVI may be configured to capture audio streams and identify a word or phrase, such as the phrase "broccoli soup" as a first factor. Further, the IDVI may be configured to capture and perform processing to recognize a non-verbal communication pattern that matches a stressed vocal pattern as a second factor. In response to identifying both the phrase "broccoli soup" and the pattern of speech as stressed, the IDVI may perform the assistance action. The determination of multiple factors may prevent any false positive triggering of the assistance action, while also ensuring an assistance action is performed reliability when a user is stressed.

The IDVI may be configured to perform more complex tasks and operations as part of an assistance action. In detail, a user may define one or more isolated tasks (e.g., calling other individuals, initiating audible alarms, and start recording audio) as a singular assistance action. Later, the IDVI may perform all of the isolated tasks contemporaneously in response to identifying an audio intent trigger. This user may benefit from the assistance action, as they only need to perform a singular operation, e.g., communicating an audio intent trigger. The IDVI may responsively perform all the previously isolated tasks of the assistance action, and the user can focus on reducing the stress of the situation.

The IDVI may leverage multiple devices that are in the environment of a user. Specifically, the IDVI may leverage a mobile computing device such as a laptop, smartphone, or tablet. The IDVI may leverage a wearable computing device such as a smartwatch, headphones with a microphone, or a wearable headset. The IDVI may leverage a group of devices, such as a personal area network ("PAN"). A PAN may include a local network of paired devices that surround a user. The PAN may allow the paired devices to perform computing tasks together, such as splitting up processing operations into discrete tasks between the paired computing devices. In context of an IDVI, the PAN may allow some devices to obtain an audio stream of a user, such as a headset having microphones worn in the ears of a user. The headset may wirelessly communicate through the PAN the audio stream to a smartphone of the user, and the smartphone may perform other operations such as identifying audio intent triggers and responsively performing assistance actions.

The IDVI may be implemented as part of a crowd-sourced platform across the Internet. For example, users may define trigger words, repeat factors, stress levels, and other relevant preferences as a personal profile. The defined preferences of the personal profile may be stored on a platform or profile (e.g., smartphone profile, online cloud service provider profile, Internet-connected wearable device profile). The preferences may also be defined with a publicity or scope indicator (e.g., personal, group, co-locality, universal) and participation indicator.

Other users may also opt into using IDVI and may also upload other personal profiles. The IDVI may periodically generate a list for each type of scope indicator, containing the aggregated user-defined audio intent triggers (e.g., trigger words, repeat factors, stress levels). The IDVI may transmit the general list to each user device that has opted into the IDVI. The general list may be stored by each user device. In some embodiments, the specific preferences of a personal profile may be encrypted and distributed to user devices that opt in to the IDVI. Each of the user devices may include a secure element that stores and has access to any distributed personal profile for processing. For example, depending on the participation indicator, a user's device may have a defined circle of trust (e.g., friends, family, co-workers). Each user device in the circle of trust may have a corresponding personal profile with specific audio intent triggers and other predefined metadata. Periodically (e.g., hourly, daily, weekly), the corresponding personal profiles may be synchronized across the user devices in the defined circle of trust. In some embodiments, the distribution may be based on location. For example, those devices in the circle of trust that share a specific geographic location may be updated daily, and those that are separated geographically may be updated less frequently, such as weekly.

Figure 1:
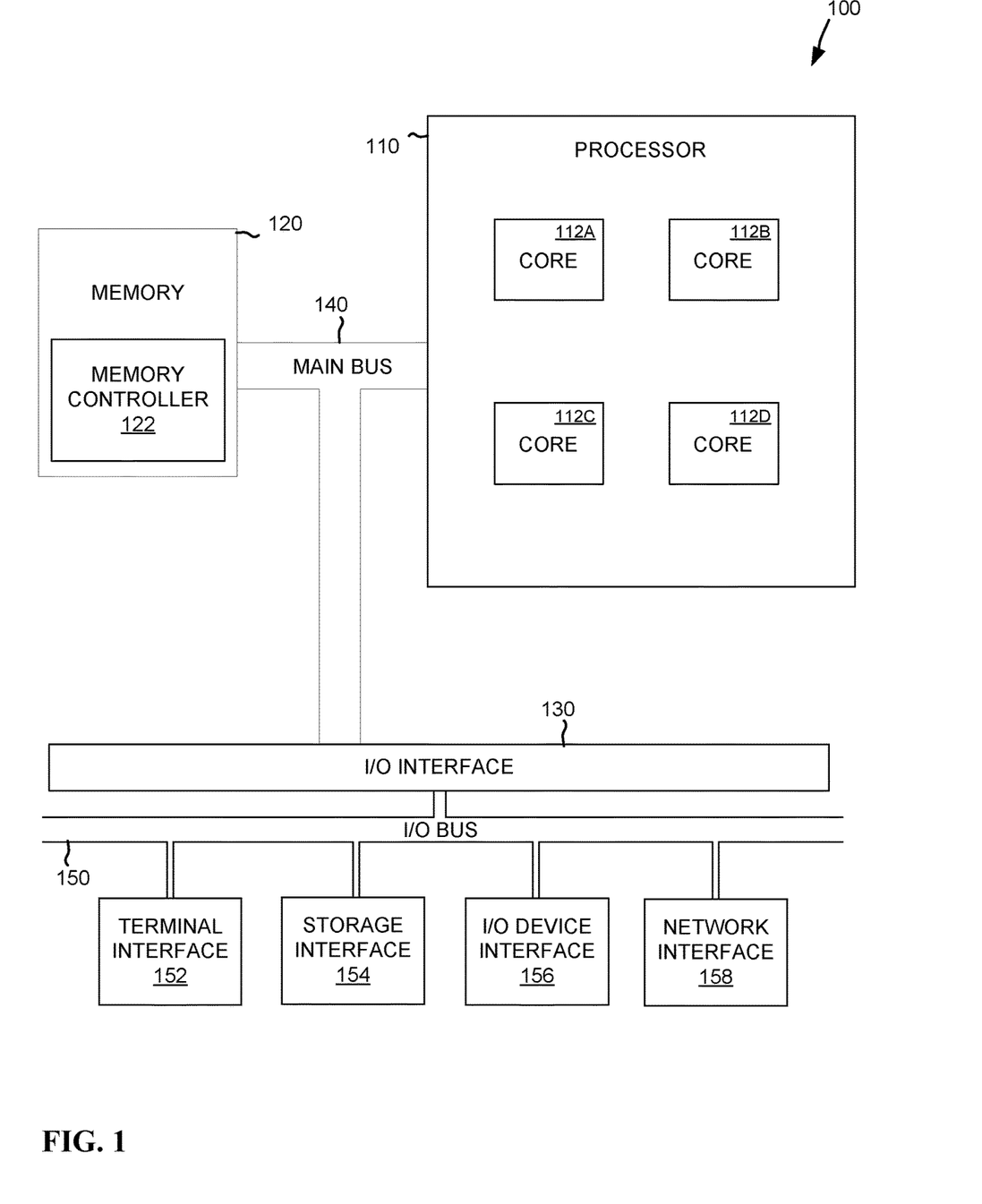
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
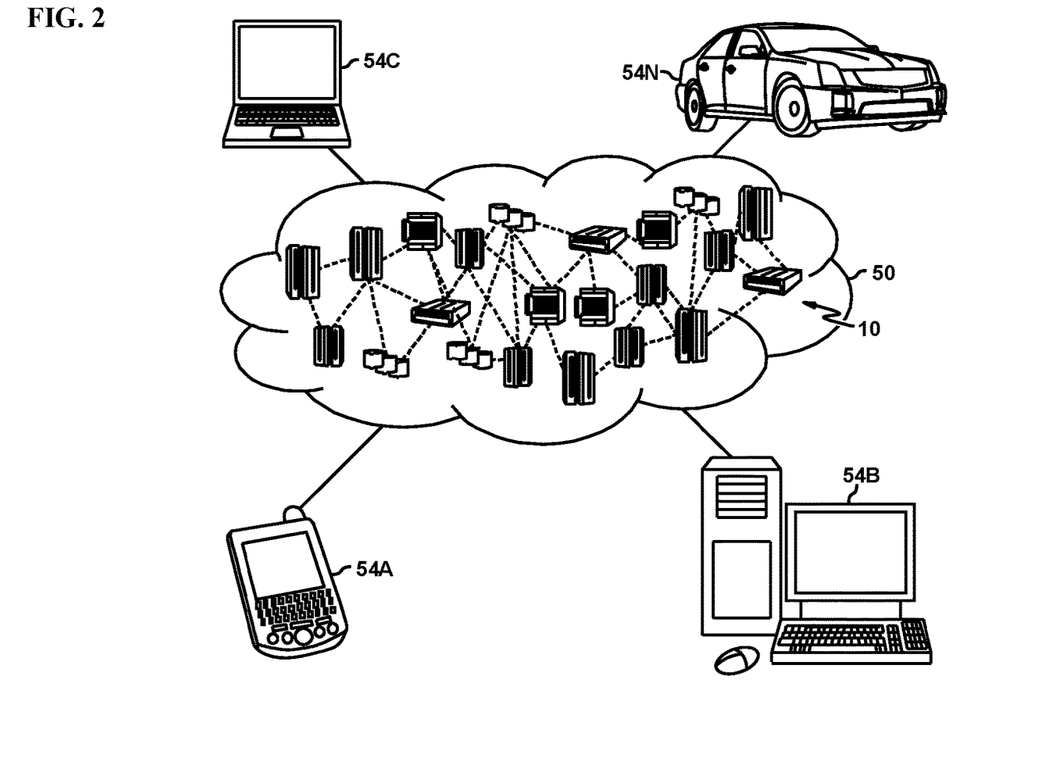
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
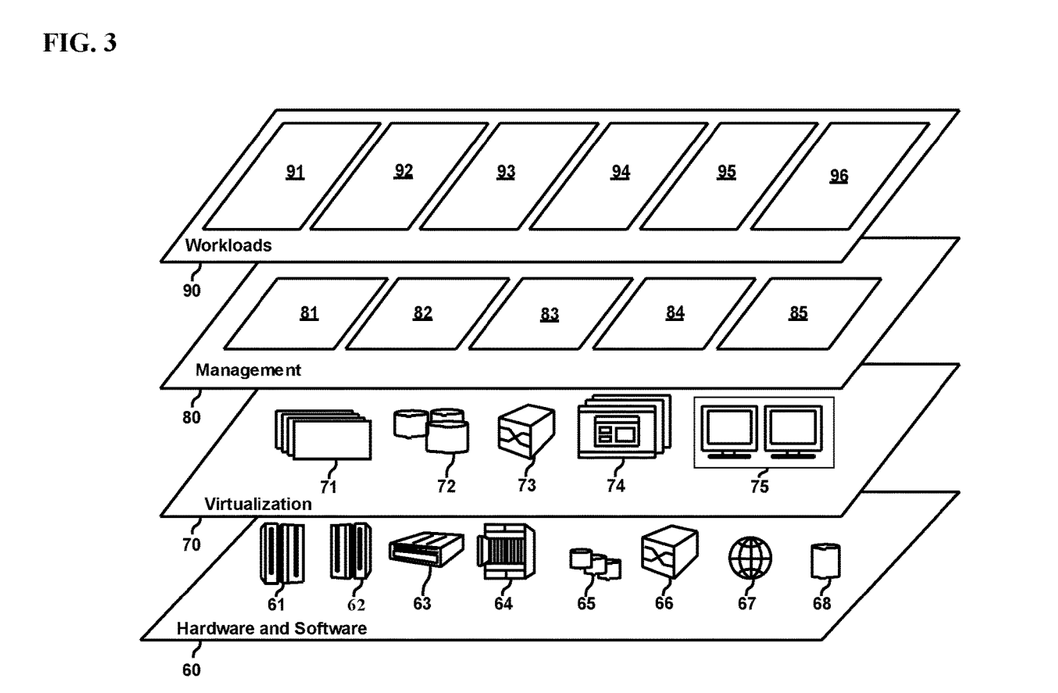
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IDVI 96.

Figure 4:
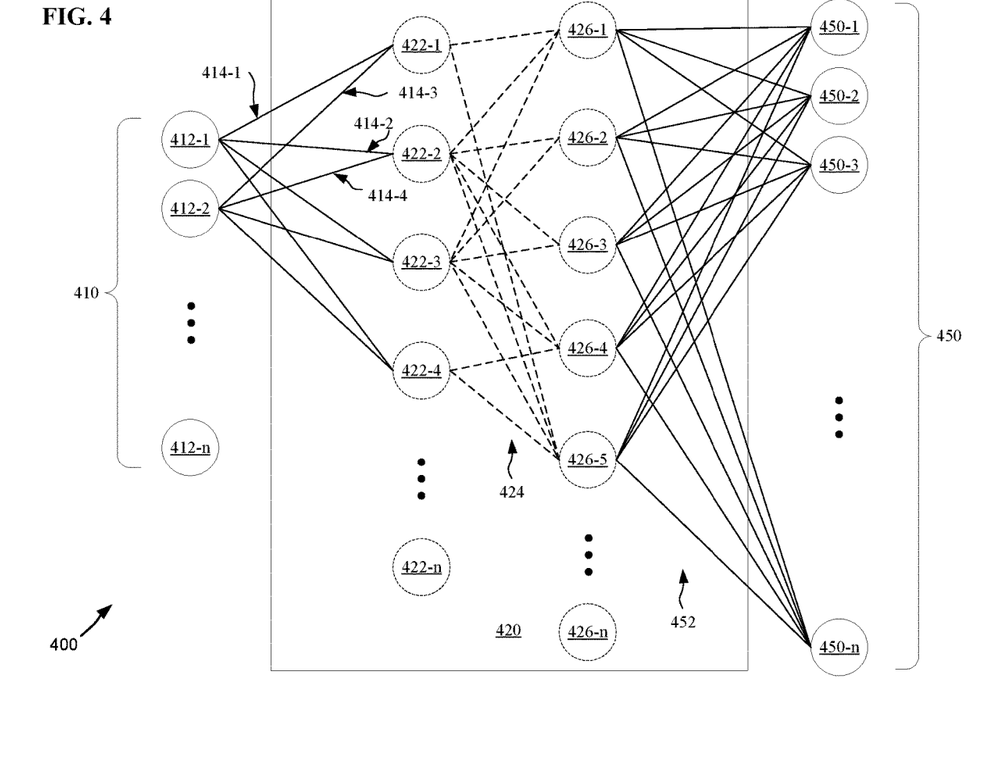
FIG. 4 depicts an example neural network representative of one or more artificial neural networks capable of identifying an intent from an audio stream consistent with embodiments of the present disclosure.

FIG. 4 depicts an example neural network (alternatively, "network") 400 representative of one or more artificial neural networks capable of identifying an intent from an audio stream consistent with embodiments of the present disclosure. The neural network 400 is made up of a plurality of layers. The network 400 includes an input layer 410, a hidden section 420, and an output layer 450. Though network 400 depicts a feed-forward neural network, it should be appreciated that other neural networks layouts may also be configured to identify an intent from an audio stream such as a recurrent neural network layout (not depicted). In some embodiments, the network 400 may be a design-and-run neural network and the layout depicted may be created by a computer programmer. In some embodiments, the network 400 may be a design-by-run neural network, and the layout depicted may be generated by the input of data and by the process of analyzing that data according to one or more defined heuristics. The network 400 may operate in a forward propagation by receiving an input and outputting a result of the input. The network 400 may adjust the values of various components of the neural network by a backward propagation (back propagation).

The input layer 410 includes a series of input neurons 412-1, 412-2, up to 412-n (collectively, 412) and a series of input connections 414-1, 414-2, 414-3, 414-4, etc. (collectively, 414). The input layer 410 represents the input from data that the neural network is supposed to analyze (e.g., a series of sound samples, a stream of audio, profile information, metadata information regarding the audio, text that corresponds to spoken words). Each input neuron 412 may represent a subset of the input data. For example, the neural network 400 is provided with an audio stream that is in the form of a plurality of number values representing a frequency of a particular point in the audio stream as input, and each values is represented by an input neuron 412.

The input connections 414 represent the output of the input neurons 412 to the hidden section 420. Each of the input connections 414 varies depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the network neural 400 may have different weightings for each connection 414, some embodiments may contemplate weights that are similar. In some embodiments, each of the values of the input neurons 412 and the connections 414 may necessarily be stored in memory.

The hidden section 420 includes one or more layers that receive inputs and produce outputs. The hidden section 120 includes a first hidden layer of calculation neurons 422-1, 422-2, 422-3, 422-4, up to 422-n (collectively, 422); a second hidden layer of calculation neurons 426-1, 426-2, 426-3, 426-4, 426-5, up to 426-n (collectively 426); and a series of hidden connections 424 coupling the first hidden layer and the second hidden layer. It should be appreciated that neural network 400 only depicts one of many neural networks capable of identifying an audio intent trigger from an audio stream consistent with some embodiments of the disclosure. Consequently, the hidden section 420 may be configured with more or less hidden layers (e.g., one hidden layer, seven hidden layers, twelve hidden layers, etc.)—two hidden layers are depicted for example purposes.

The first hidden layer 422 includes the calculation neurons 422-1, 422-2, 422-3, 422-4, up to 422-n. Each calculation neuron of the first hidden layer 422 may receive as input one or more of the connections 414. For example, calculation neuron 422-1 receives input connection 414-1 and input connection 414-2. Each calculation neuron of the first hidden layer 422 also provides an output. The output is represented by the dotted lines of hidden connections 424 flowing out of the first hidden layer 422. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons must necessarily be stored in memory.

The neural network 400 may include the use of a sigmoid neuron for the activation function of calculation neuron 422-1. An equation (Equation 1, stated below) may represent the activation function of calculation neuron 412-1 as f(neuron). The logic of calculation neuron 422-1 may be the summation of each of the input connections that feed into calculation neuron 422-1 (i.e., input connection 414-1 and input connection 414-3) which are represented in Equation 1 as j. For each j the weight w is multiplied by the value x of the given connected input neuron 412. The bias of the calculation neuron 422-1 is represented as b. Once each input connection j is summed the bias b is subtracted. Finalizing the operations of this example as follows: given a larger positive number of results from the summation and bias in activation f(neuron), the output of calculation neuron 422-1 approaches approximately 1; given a larger negative number of results from the summation and bias in activation f(neuron), the output of calculation neuron 422-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer 426 includes the calculation neurons 426-1, 426-2, 426-3, 426-4, 426-5, up to 426-$n$. In some embodiments, the calculation neurons of the second hidden layer 426 may operate similarly to the calculation neurons first hidden layer 422. For example, the calculation neurons 426-1 to 426-$n$ may each operate with a similar activation function as the calculation neurons 422-1 to 422-$n$. In some embodiments, the calculation neurons of the second hidden layer 426 may operate differently to the calculation neurons of the first hidden layer 422. For example, the calculation neurons 426-1 to 426-$n$ may have a first activation function, and the calculation neurons 422-1 to 422-$n$ may have a second activation function.

Similarly, the connectivity to, from, and between the various layers of the hidden section 420 may also vary. For example, the input connections 414 may be fully connected to the first hidden layer 422 and hidden connections 424 may be fully connected from the first hidden layer to the second hidden layer 426. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 414 may not be fully connected to the first hidden layer 422 and the hidden connections 424 may not be fully connected from the first hidden layer to the second hidden layer 426.

Further, the parameters to, from, and between the various layers of the hidden section 420 may also vary. In some embodiments, the parameters may include the weights and the biases. In some embodiments, there may be more or less parameters than the weights and biases. For purposes of example, neural network 400 may be in the form of a convolutional neural network or convolution network. The convolutional neural network may include a sequence of heterogeneous layers (e.g., an input layer 410, a convolution layer 422, a pooling layer 426, and an output layer 450). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-$n$ (collectively, 450). The output layer 450 holds a result of the analyzation of the neural network 400. In some embodiments, the output layer 450 may be a categorization layer used to identify a feature of the input to the network 400. For example, the network 400 may be a classification network trained to identify Arabic numerals. In such an example, the network 400 may include ten output neurons 450 corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be only a singular output neuron (not depicted). The output layer 450 is fed from an output connection 452. The output connection 452 provides the activations from the hidden section 420. In some embodiments, the output connections 452 may include weights and the output neurons 450 may include biases.

Training the neural network depicted by neural network 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 400 by starting with the output neurons 450 and propagating the error backward through the various connections 452, 424, 414 and layers 426, 422, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation, the result or determination may be an incorrect determination. For example, neural network 400 may be a classification network, may be provided with a fourteen second audio stream as input that contains the spoken word "help", and may determine that the spoken word is most likely "kelp" and is second most likely "hello" and is third most likely "help" (and so on with other spoken words). Continuing the example, performing a back propagation may alter the values of the weights of connections 414, 424, and 452; and may alter the values of the biases of the first layer of calculation neurons 422, the second layer of calculation neurons 426, and the output neurons 450. Further continuing the example, the performance of the back propagation may yield a future result that is a more accurate classification of the same fourteen second audio stream input that contains the number "help" (e.g., more closely ranking "help", "kelp", then "hello" in order of most likely to least likely, ranking "help" as the most likely spoken word, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 400. The network 400 is provided a given number of training inputs n in a subset (or entirety) of training data that have input values x. The network 400 may yield output a from x and should yield a desired output y(x) from x. Back propagation or training of the network 400 should be a reduction or minimization of the objective function 'O(w,b)' via alteration of the set of weights and biases. Successful training of network 400 should not only include the reduction of the difference between the answer a and the correct answers y(x) for the input values x, but given new input values (e.g., from additional training data, from validation data, etc.).

$$O(w, b) \equiv \frac{1}{2n} \sum_x \|y(x) - a\|^2 \quad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 400 may be small in any given iteration. Back propagation algorithms may need to be repeated for many iterations to perform accurate learning as a result of the necessitated smallness of any given iteration.

For example, neural network 400 may have untrained weights and biases, and back propagation may involve the stochastic gradient descent to train the network over a subset of training inputs (e.g., a batch of 10 training inputs from the entirety of the training inputs). Continuing the example, network 400 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too few training epochs may not yield a fully trained network, too many training epochs may yield overfitting in a trained network, etc.). Further, network 400 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Figure 5:
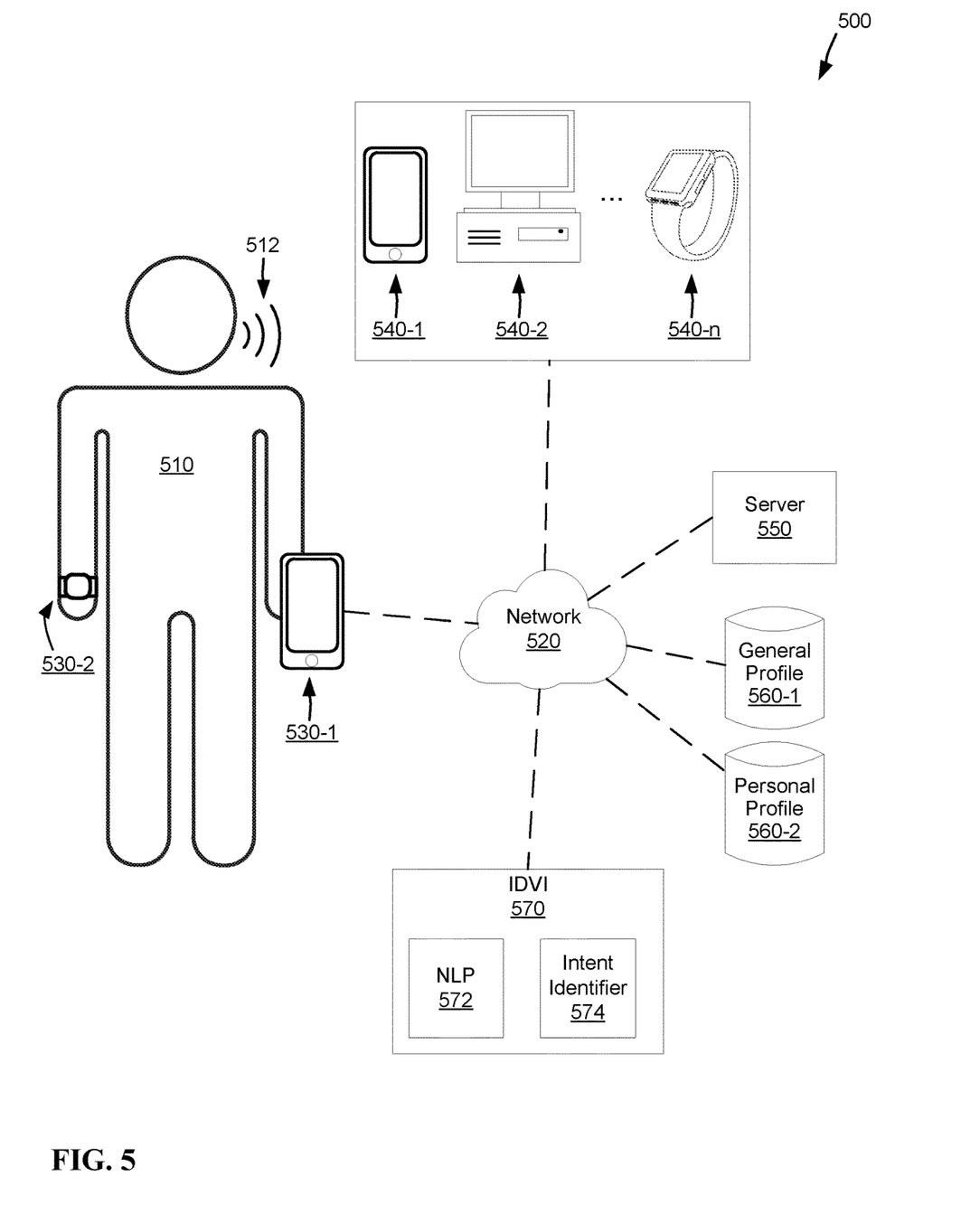
FIG. 5 depicts an example system of performing intent driven assistance responsive to audio streams of a user, consistent with some embodiments of the disclosure.

FIG. 5 depicts an example system 500 of performing intent driven assistance responsive to audio streams of a user, consistent with some embodiments of the disclosure.

System 500 may include the following: a user 510; a communications network 520; a set of one or more user devices 530-1 and 530-2 (collectively, user devices 530); a set of one or more secondary devices 540-1, 540-2, up to 540-n (collectively, secondary devices 540); a remote server 550; a general user profile 560-1 and a personal user profile 560-1 (collectively, user profiles 560); and an IDVI 570. The user 510 may be located in an environment (not depicted) where a stressful situation may occur. For example, the user 510 may be in a hotel room that contains a voice assistant device (not depicted) that is responsive to the "Alisha" predefined wake word. In another example, the user 510 may be walking along a city street around other users (not depicted). The user 510 may make noise 512, such as by speaking, yelling, crying, uttering, or otherwise generating verbal sounds in the environment.

Network 520 may be one or more networks configured to send and receive data from various computing devices, such as datagrams, network packets, and other relevant traffic. Network 520 may be a personal area network, such as an 802.15 network between user devices 530-1 and 530-2. Network 520 may be a local area network, such as an 802.11 wireless network between devices 530-1 and 540-1. Network 520 may be a wide area network, such as the Internet. In some embodiments, network 520 may be a plurality of networks. For example, network 520 may include a plurality of routers and devices (not depicted) to communicatively couple the other components of system 500 together.

The user devices 530 may be computing devices configured to perform operations for the user 510. Each of the user devices 530 may operate as a computer, such as computer system 100 (e.g., including processing and memory resources and equipped with I/O interfaces to receive input from the user 510 and send output to the user 510). The user devices 530 may be personal, wearable, or mobile computing devices. For example, user device 530-1 may be a smartphone. In another example, user device 530-2 may be a smartwatch.

The secondary devices 540 may be computing devices configured to perform operations for other users (not depicted). Each of the secondary devices 540 may operate as a computer, such as computer system 100 (e.g., including processing and memory resources and equipped with I/O interfaces to receive input from send output to various users). The secondary devices 540 may be personal, wearable, or mobile computing devices. For example, secondary devices 540-1 may be a smartphone. In another example, secondary devices 540-2 may be personal computers. In yet another example, the secondary device 540-n may be a smartwatch. Each of the secondary devices 540 may be located in the environment (not depicted) of the user 510. For example, the user 510 may be on a walk with some co-workers (not depicted) and secondary device 540-1 may be the smartphone of one of the co-workers that is on the walk. In another example, the user 510 may be in a public library with another library patron (not depicted), and secondary computer 540-2 may be a personal computer owned by the library currently in use by the other patron. The secondary devices 540 may be located outside of the environment. For example, secondary device 540-2 may be a computer of a friend of the user 510 that is located in another geographic location.

Certain secondary devices 540 may be identified as trusted devices. In some embodiments, the user 510 may transmit through one of the user devices 530 an invitation (e.g., a text message invitation, an email) to a subset of secondary devices 540. The invitation may be for users of the subset of secondary devices 540 to join a circle of trust or to become trusted devices. In some embodiments, the user devices 530 may automatically identify and contact other secondary devices 540 to become part of the trusted devices. For example, a user 510 may specify in a profile (e.g., personal user profile 560) the contact information of certain individuals (not depicted), and based on the contact information, the secondary devices 540 of the certain individuals may be contacted. In another example, a user 510 may join a messaging service or device platform that includes IDVI capability along with other users. Any other users that join the service or platform may have the secondary devices 540 as part of the circle of trust have installed an instance of the IDVI 570.

Server 540 may be a computing device configured to perform one or more operations of system 500, e.g., computer system 100. Server 540 may be a set of computer systems (e.g., five, a dozen, hundreds) of computers configured to perform operations of system 500. For example, server 540 may operate as a part of cloud computing environment 50, and without exposing to other parts of system 500 any specific component or portion.

The user profiles 560 may store information about audio intent triggers and other data and metadata for system 500. Specifically, the user profiles 560 may contain data that is used by the IDVI 570 in various instances. In some embodiments, the user profiles 560 may be stored on a device of the user 510, such as in user device 530-1 and/or user device 530-2. In some embodiments, the user profiles 560 may be stored by the secondary devices 540. For example, a copy of the user profiles 560 may be stored by secondary device 540-1. The secondary device 540-1 may store a copy of personal user profile 560-2 in an encrypted fashion, such as in a secure element. A secure element or secure enclave may be a sub-section or sub-system of a microprocessor or separate microprocessor integrated into a computing device, such as the secondary computing device 540-1. The secure element may be able to access data stored in the copy of the personal user profile 560-2, but other components may not have access. For example, a processor of secondary device 540-1 may not be able to access or otherwise obtain any information from a copy of personal user profile 560-2, but a secure element of the secondary device 540-1 may have access. In some embodiments, the user profiles 560 may be stored by a server, such as a copy of general user profile 560-1 stored unencrypted and a copy of personal user profile 560-2 stored in an encrypted manner.

The general user profile 560-1 may store one or more words, phrases, sounds, and non-verbal metadata that are associated with audio intent triggers. The stored data in general user profile 560-1 may be in the form of aggregate or common data. The words, phrases, and sounds may be common audio intent triggers that are used by various users of IDVI 570 across various instances. For example, multiple instances of system 500 may be operational, and various users may set common phrases such as "I'm in trouble" or "please help" as audio intent triggers. The general user profile 560-1 may contain parameters, values, or other metadata regarding general differences in human speech when affected by stress. For example, metadata may include the speed of speech, the rate of speech, the tone of speech, the variability of speech while both stressed and while also not being stressed for comparison and identification of an audio intent trigger.

The personal user profile 560-2 may store one or more words, phrases, sounds, and non-verbal metadata that relates to a particular user. For example, the personal user profile 560-2 may store phrases set by the user 510, such as "awake" or "get help" as an audio intent trigger. The personal user profile 560-2 may also include metadata that describes stressed and unstressed speech of the user 510. For example, the personal user profile 560-2 may include a rate of speech of the user 510 when the user is in an unstressed state and may also include a rate of speech of the user 510 when the user is in a stressed state. The personal user profile 560-2 may also include a repeat factor. For example, a repeat factor may be that a word is to be repeated four times in thirty seconds. In another example, a repeat factor may be that a word is to be repeated three times in seven seconds. The personal user profile 560-2 may include various predefined assistance actions that may be linked to differing audio intent triggers. For example, an entry in a list of personal user profile 560-2 may include the audio intent trigger "I'm scared" associated with the assistance action of calling emergency services. In a second example, an entry in a list of personal user profile 560-2 may include the audio intent trigger of "look out" with a repeat factor of three times in twelve seconds associated with the assistance action of playing an audible alert on all secondary devices 540 in the environment.

The IDVI 570 may be configured to respond to an audio stream from the user 510. The IDVI 570 may include a natural language processing system 572 and an intent identifier 574. As the user makes noise 512 in an environment, a device may capture an audio stream that includes the noise (e.g., a user device 530, a secondary device 540). The IDVI 570 may be configured to capture and analyze the audio to detect speech, or other noise from the user 510, and to identify an audio intent trigger and initiate an assistance action response to the audio intent trigger. The IDVI 570 may be a portion of software, such as one or more programs, daemons, utilities, or other relevant software construct. The IDVI 570 may be embedded into one or more components of system 500. For example, an instance of IDVI 570 may execute on the user devices 530, the secondary device 540, and/or the server 550. The IDVI 570 may leverage a voice-based platform of one or more of the components of the system 500. For example, user device 530-1 may be configured to continuously listen for or record an audio signal from a transceiver (e.g., an audio transceiver) and may perform a rudimentary form of voice-processing to identify words or speech. The IDVI 570 may intercept the audio signal from the user device 530-1 for processing.

The IDVI 570 may operate with elevated privileges as part of a computer of the system 500. For example, an instance of the IDVI 570 may operate as part of server 550. In a second example, an instance of the IDVI 570 may operate under a secure element of a user device 530 or a secondary device 540. Specifically, the IDVI 570 may be a module that is configured to receive an audio stream from a microphone or other transceiver of a computing device in the environment. The IDVI 570 may scan for a particular phrase, utterance, or audio intent trigger from the audio stream, and responsively issue or initiate an assistance action. After operating, the IDVI 570 may be configured to pass the stream of audio to an operating system or other component that is configured to perform pre-installed voice interface functionality. In some embodiments, the IDVI 570 may operate across a plurality of components of system 500. For example, a noise 512 from user 510 may be received by an instance of IDVI 570 operating on user device 530-2. User device 530-2 may transmit a signal through an instance of network 520 to user device 530-1 to begin recording audio streams for processing. User device 530-2 may execute a second instance of IDVI 570 to determine based on a first audio processing technique a complexity level in certain sound waves or other data in the audio stream, such as detecting an acoustic communication from the user 510. Responsive to the acoustic communication, the second instance of the IDVI 570 may transfer the audio stream to server 550 to perform a more processing or memory-intense second audio processing technique.

The natural language processing system 572 of the IDVI 570 may include various components (not depicted) operating through hardware, software, or in some combination. In detail, the natural language processing system 572 may include one or more data sources, a search application, and a report analyzer. The natural language processing system 572 may be a computer module that analyses received content and other information, such as noise 512 from the environment. The natural language processing system 572 may perform various methods and techniques for analyzing textual information (e.g., syntactic analysis, semantic analysis, etc.). The natural language processing system 572 may be configured to recognize and analyze any number of natural languages. In some embodiments, the natural language processing system 572 may perform text-to-speech operations and/or parse passages of documents or content from user 510. Various components (not depicted) of the natural language processing system 572 may include, but are not limited to, a tokenizer, a part-of-speech (POS) tagger, a semantic relationship identifier, and a syntactic relationship identifier. The natural language processing system 572 may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., transcriptions of previous speech of the user 510, the previous speech of other users). Examples of parts of speech that may be assigned to words include, but are not limited to, nouns, verbs, adjectives, adverbs, and the like. Examples of other parts of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system 572.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences, such as, which groups of words are associated as phrases and which word is the subject or object of a verb. The syntactic relationship identifier may conform to formal grammar.

In some embodiments, the natural language processing system 572 may be a computer module that may parse a document and generate corresponding data structures for one or more portions of the document. For example, in response to receiving an audio stream captured from a component of system 500, the natural language processing system 572 may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

The intent identifier 574 may be a collection of software and hardware configured to identify an intent of the user. The intent identifier 574 may operate by detecting acoustic communication in the audio stream. In some embodiments, the intent identifier 574 may be configured to also detect speech in the audio stream. Specifically, the intent identifier 574 may receive as input the output of the natural language processing system 572. The intent identifier 574 may also identify an audio intent trigger of the user 510.

The intent identifier 574 may execute an artificial intelligence or machine learning technique. In some embodiments, the intent identifier 574 may execute as an instance of neural network 400. In some embodiments, the intent identifier 574 may execute on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The IDVI 570 may be configured to perform an assistance action in response to identifying an audio intent trigger. The assistance action may be an instruction to receive input. For example, the IDVI 570 may instruct user device 530-2 to record biometric data of user 510, and may instruct user device 530-1 to record sound, video, camera input, ambient noise, or other relevant records of the environment. In some embodiments, the IDVI 570 may instruct trusted devices to record input of the environment. For example, a subset of the secondary device 540 may be trusted devices; devices authorized by the personal user profile 560-2 to record and process audio intent of the environment on behalf of the user 510. The subset of secondary devices 540 may also record sound and/or video of the environment as part of the assistance action. In some embodiments, the IDVI 570 may instruct all secondary devices 540 in the environment to perform capture or recording, such as transmitting through a Bluetooth or WiFi local area network broadcast signal. The user devices 530 and/or secondary devices 540 may be configured to record a location, such as global positioning system ("GPS") data as part of the assistance action.

The assistance action may be a communication to other individuals in the environment, such as lights, sounds, sirens, alarms, or other audiovisual information. For example, user device 530-1 may begin making a loud alarm noise. The assistance action may be a haptic alert. For example, the assistance action may be a force feedback from a motor (not depicted) integrated into secondary device 540-1. In some embodiments, one or more of the user devices 530 and/or secondary devices 540 may play a noise or a pre-rerecorded message (previously recorded by the user) that instructs others in the environment on how to help. For example, the user 510 may previously record information about the user's emergency contact information as a speech or type a text message. Responsive to the users blurting out an audio intent trigger of "help, I'm hurt" in a stressed tone, the assistance action may be to play aloud the pre-recorded information or broadcast the pre-recorded text message to devices in the environment. In some embodiments, the pre-recorded message may be sent to other devices across the network 520, such as to other secondary devices 540 of users in other geographic locations. In some embodiments, the IDVI 570 may be configured to broadcast information generally, such as posting a request for assistance to a social media site.

Figure 6:
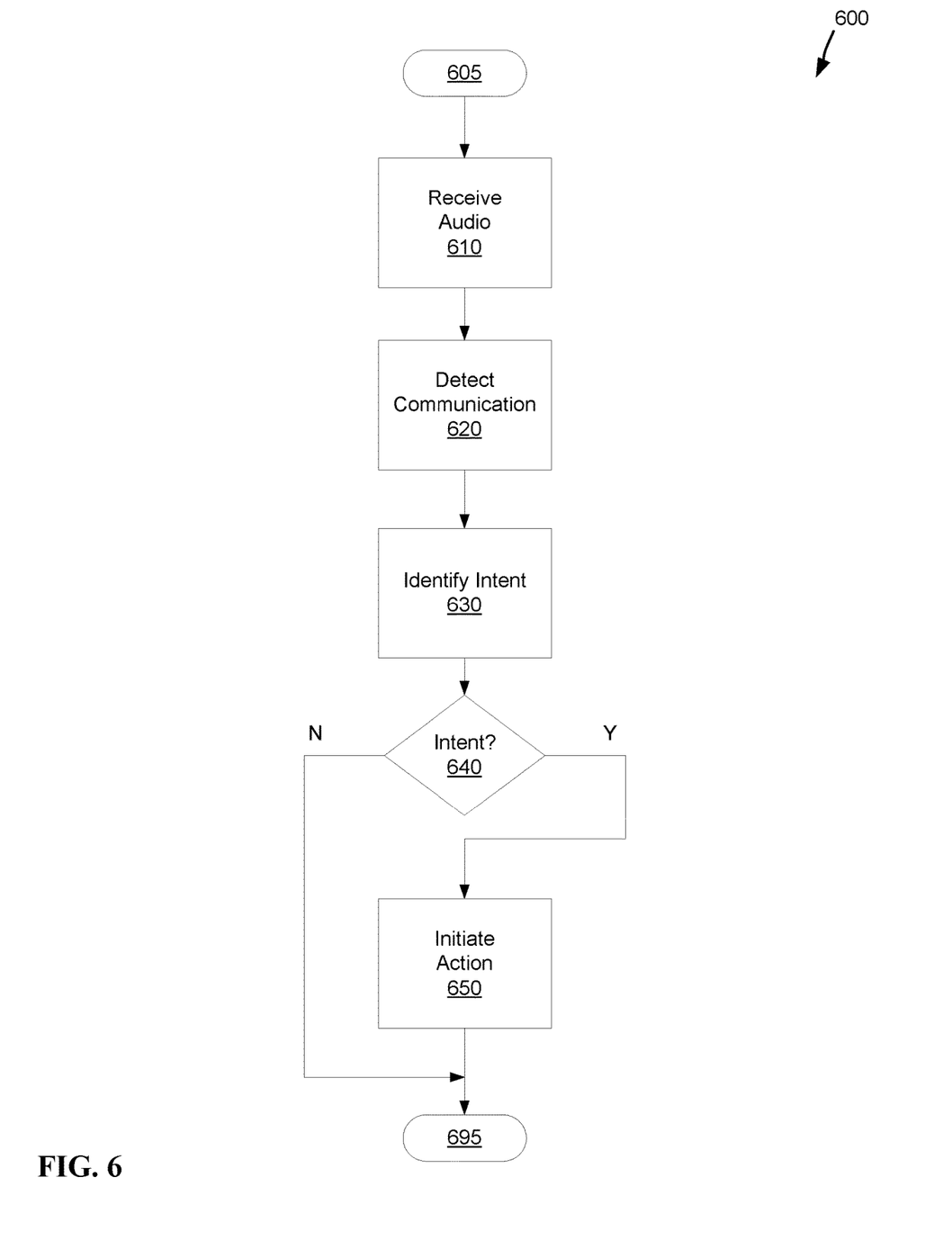
FIG. 6 depicts an example method of providing assistance to a user, consistent with some embodiments of the disclosure.

FIG. 6 depicts an example method 600 of providing assistance to a user, consistent with some embodiments of the disclosure. Method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 600 may be performed by an IDVI, such as IDVI 570.

Method 600 may begin at 605, by receiving a stream of audio at 610. The stream of audio may be received from a computing device of a user. For example, a user may have a smartphone with an integrated microphone, and the smartphone may capture the audio stream of the environment. The audio stream may be received from an accessory device of a computing device. For example, an audio headset paired to a smartwatch of a user may be configured to receive an audio stream.

At 620 an acoustic communication of a user may be detected. The acoustic communication may be detected based an analysis technique such as natural language processing. The acoustic communication may be detected based on a sound processing technique, such as detecting a fluctuation in the amount or frequency of a sound wave that is a part of the received audio stream.

At 630 an audio intent trigger may be identified. The identification of the audio intent trigger may be based on performing sentiment and tone analysis—for example, by performing machine learning or other artificial intelligence techniques against the received audio stream. The identification of the audio intent trigger may be based upon a user specification, such as based on matching a key word or phrase that is stored in a user profile. In some embodiments, the audio intent trigger may be identified by environmental and Bag of Words data that can be used to signal distress, such as "help" being a word in the audio stream along with sirens or alarm noises also being in the audio stream.

If the audio intent trigger is identified, at 640:Y, an assistance action may be initiated at 650. The assistance action may be initiated within a proximity. Specifically, a user device may scan the general environment (e.g., within cellular signal range, within Bluetooth range) and perform a transmit or send assistance action to request help to other computing devices within the geographical area. In some embodiments, the assistance action may be tailored to the area or situation. For example, if one or more other voices were detected in the audio stream, the assistance action may be performed without an audible and/or visible notification to the user. This silent assistance action may prevent other individuals in the area from noticing IDVI operation. The assistance action may be an alarm or human-detectable alert, designed to engage other individuals in the area, such as an audible, haptic, visual, local, distributed alert. The assistance action may be initiating a recording by a camera and/or microphone of a user device (e.g., commanding all smartphones in the area, commanding a smartphone of a user, commanding a smartphone of an individual that is a trusted device). In some embodiments, some subset of mobile devices in the environment may be initiated to perform an assistance action. For example, users may opt in to performing IDVI for other users by setting a toggle on their smartphone, and those smartphones may be initiated to perform assistance actions. In some embodiments, emergency services may be contacted as a part of initiating an assistance action.

After initiating an assistance action at 650, or if an audio intent trigger is not identified at 640:N, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
receiving, from an audio transceiver of a computing device of a second user, an audio stream in an environment that includes audio of a first user, wherein the audio transceiver is integrally coupled to the computing device of the second user, and wherein the computing device of the second user is located in the environment;
detecting, from the audio stream, an acoustic communication of the first user;
identifying, from the audio stream and based on the acoustic communication, an audio intent trigger of the first user; and
initiating, in response to the audio intent trigger and by a voice-based interface, an assistance action for the first user, wherein the assistance action includes instructing a computing device of the first user to generate an audiovisual alert.

2. The method of claim 1, wherein the audio intent trigger is identified by a central server, and wherein the method further comprises:
transmitting the audio stream to the central server.

3. The method of claim 2, wherein the detecting of the acoustic communication is by the computing device of the second user in the environment, and wherein the transmitting is responsive to the detecting.

4. The method of claim 1, wherein the identifying includes performing a machine learning technique on the audio stream.

5. The method of claim 4, wherein the machine learning technique is based on a predefined general profile.

6. The method of claim 5, wherein the identifying is performed by the computing device of the second user that is located in the environment.

7. The method of claim 5, wherein the machine learning technique is based on a predefined first user profile, wherein the identifying is performed by a secure element of the computing device of the second user, and wherein the method further comprises:
encrypting the predefined first user profile; and
transmitting the encrypted predefined first user profile to the secure element of the computing device of the second user.

8. The method of claim 4, wherein the machine learning technique is based on a predefined first user profile.

9. The method of claim 8, wherein the predefined first user profile includes a trigger word.

10. The method of claim 9, wherein the predefined first user profile includes a repeat factor for a number of times the first user is to say the trigger word and wherein the predefined first user profile includes a repeat period for an amount of time to repeat the trigger word.

11. The method of claim 9, wherein the trigger word is different from a predefined wake word of the voice-based interface.

12. The method of claim 8, wherein the predefined first user profile includes a predefined rate of speech for the first user, and wherein the identifying includes detecting speech in the audio stream that differs from the predefine rate of speech.

13. The method of claim 8, wherein the predefined first user profile includes a predefined tone of speech for the first user, and wherein the identifying includes detecting speech in the audio stream that differs from the predefined tone of speech.

14. The method of claim 1, wherein the assistance action includes instructing a computing device of the first user to generate an audiovisual recording of the environment.

15. The method of claim 1, wherein the assistance action includes instructing the computing device of the second user to generate an audiovisual alert.

16. The method of claim 1, wherein the assistance action includes the computing device of the second user to generate an audiovisual recording of the environment.

17. A system, the system comprising:
a memory, the memory containing one or more instructions; and
a processor, the processor communicatively coupled to the memory, the processor, in response to reading the one or more instructions, configured to:
receive, from an audio transceiver of a computing device of a second user, an audio stream in an environment that includes audio of a first user, wherein the audio transceiver is integrally coupled to the computing device of the second user, and wherein the computing device of the second user is located in the environment;
detect, from the audio stream, an acoustic communication of the first user;
identify, from the audio stream and based on the acoustic communication, an audio intent trigger of the first user; and
initiate, in response to the audio intent trigger and by a voice-based interface, an assistance action for the first user, wherein the assistance action includes instructing a computing device of the first user to generate an audiovisual recording of the environment.

18. A computer program product, the computer program product comprising:
one or more computer readable storage media; and
program instructions collectively stored on the one or more computer readable storage media, the program instructions configured to:
receive, from an audio transceiver of a computing device of a second user, an audio stream in an environment that includes audio of a first user, wherein the audio transceiver is integrally coupled to the computing device of the second user, and wherein the computing device of the second user is located in the environment;
detect, from the audio stream, an acoustic communication of the first user;
identify, from the audio stream and based on the acoustic communication, an audio intent trigger of the first user; and
initiate, in response to the audio intent trigger and by a voice-based interface, an assistance action for the first user, wherein the assistance action includes instructing a computing device of a second user to generate an audiovisual alert.

* * * * *